(12) United States Patent
Bhatnagar

(10) Patent No.: US 11,790,521 B2
(45) Date of Patent: Oct. 17, 2023

(54) SYSTEM AND METHOD TO USE MACHINE LEARNING TO ENSURE PROPER INSTALLATION AND/OR REPAIR BY TECHNICIANS

(71) Applicant: Hughes Network Systems, LLC, Germantown, MD (US)

(72) Inventor: Anurag Bhatnagar, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 292 days.

(21) Appl. No.: 16/845,364

(22) Filed: Apr. 10, 2020

(65) Prior Publication Data

US 2021/0319549 A1 Oct. 14, 2021

(51) Int. Cl.
*G06T 7/00* (2017.01)
*G06N 20/00* (2019.01)

(52) U.S. Cl.
CPC ........... *G06T 7/0008* (2013.01); *G06N 20/00* (2019.01); *G06T 2207/30184* (2013.01)

(58) Field of Classification Search
CPC ......... G06T 7/0008; G06T 2207/30184; G06T 2207/20081; G06T 2207/30168; G06T 7/0002; G06N 20/00
See application file for complete search history.

(56) References Cited

U.S. PATENT DOCUMENTS 9,219,830 B1 * 12/2015 Ciorba ............... H04N 1/00177
10,332,209 B1 * 6/2019 Brandmaier ........... G06Q 40/08
2017/0148102 A1 * 5/2017 Franke ................ G06K 9/6267
2017/0262795 A1 * 9/2017 Thapa .................. G06Q 10/087
2019/0180105 A1 * 6/2019 Sasson ................... G06N 20/00
2019/0251684 A1 * 8/2019 Ko .............................. G06T 5/50
2019/0392953 A1 * 12/2019 Steuer .................... G16H 40/67

(Continued)

FOREIGN PATENT DOCUMENTS

WO 2019/157288 A1 8/2019

OTHER PUBLICATIONS

International Search Report and Written Opinion dated Jun. 30, 2021 in corresponding International Patent Application No. PCT/US21/25901, filed Apr. 6, 2021.

*Primary Examiner* — Ming Y Hon
(74) *Attorney, Agent, or Firm* — GLOBAL IP COUNSELORS, LLP

(57) ABSTRACT

A system for installation or repair work includes a mobile device and a central server. The mobile device includes a camera and a first processor. The first processor is configured to execute processing instructions including an algorithm to evaluate photographs recorded by the camera. The central server is configured to wirelessly communicate with the mobile device. The central server includes a second processor configured to execute control instructions stored on a second memory to cause the central server to: (i) receive at least one photograph evaluated by the first processor of the mobile device; (ii) perform machine learning using the at least one photograph to improve the algorithm used to evaluate the at least one photograph by the first processor; (iii) update the processing instructions using the improved algorithm; and (iv) transmit the updated processing instructions to the mobile device to enable evaluation of a subsequent photograph.

20 Claims, 4 Drawing Sheets

(56) References Cited

U.S. PATENT DOCUMENTS

| | | | |
|---|---|---|---|
| 2020/0097923 A1* | 3/2020 | Rokadia | G06N 3/088 |
| 2020/0234043 A1* | 7/2020 | Shue | B64C 39/024 |
| 2020/0311900 A1* | 10/2020 | Hurley | G06T 7/0002 |
| 2021/0027458 A1* | 1/2021 | Chor | G06F 16/5838 |
| 2021/0071855 A1* | 3/2021 | Pan | H05B 47/165 |
| 2021/0081698 A1* | 3/2021 | Lindeman | G06T 7/0006 |
| 2021/0201274 A1* | 7/2021 | O'Brien | G07C 5/085 |
| 2021/0201329 A1* | 7/2021 | van den Berg | B60K 35/00 |

\* cited by examiner

SYSTEM AND METHOD TO USE MACHINE LEARNING TO ENSURE PROPER INSTALLATION AND/OR REPAIR BY TECHNICIANS

BACKGROUND

Field of the Invention

The present disclosure generally relates to a system and method useful for ensuring proper installation and/or repair work. In particular, the present disclosure relates to a system and method which uses machine learning from photographs taken by a technician to ensure that the installation and/or repair work is performed and documented correctly.

Background Information

In various industries, technicians are required to move from site to site and perform installation and repair work. For example, in the communications industry, technicians are regularly called to homes to install and/or repair satellite receivers, antennas, grounding connections, and other electronics equipment. The extent of the installation and/or repair can change from household to household.

SUMMARY

It has been discovered that an improved system and method useful for ensuring proper installation and/or repair work is desired. In view of the state of the known technology, one aspect of the present disclosure is to provide a system for installation or repair work. The system includes a mobile device and a central server. The mobile device includes a camera, a first processor, and a first memory. The first processor is configured to execute processing instructions stored by the first memory, the processing instructions including an algorithm to evaluate photographs recorded by the camera. The central server is configured to wirelessly communicate with the mobile device. The central server includes a second processor and a second memory. The second processor is configured to execute control instructions stored on the second memory to cause the central server to: (i) receive at least one photograph evaluated by the first processor of the mobile device; (ii) perform machine learning using the at least one photograph to improve the algorithm used to evaluate the at least one photograph by the first processor of the mobile device; (iii) update the processing instructions using the improved algorithm; and (iv) transmit the updated processing instructions to the mobile device to enable evaluation of at least one subsequent photograph.

Another aspect of the present disclosure is to provide a method for installation or repair work. The method includes recording at least one first photograph on a mobile device during or after completion of a first work order, evaluating the at least one first photograph based on processing instructions stored by the mobile device, transmitting the at least one first photograph to a central server configured to perform machine learning using the at least one first photograph, receiving updated processing instructions based on the machine learning performed at the central server, recording at least one second photograph on the mobile device during or after completion of a second work order, and evaluating the at least one second photograph based on the updated processing instructions.

Another aspect of the present disclosure is to provide a mobile device for ensuring proper installation or repair work according to a work order. The mobile device includes a user interface, a camera, a memory, and a processor. The user interface is configured to be operated by a technician during completion of the work order. The camera is configured to record at least one photograph of at least one task completed by the technician in accordance with the work order. The camera is in operable communication with the user interface. The memory is configured to store processing instructions to evaluate photographs recorded by the camera. The processor is configured to execute the processing instructions stored on the memory to: (i) determine the at least one photograph to be acceptable to document the at least one task completed by the technician in accordance with the work order; (ii) when the at least one photograph is determined to be not acceptable, cause the user interface to display instructions to retake the at least one photograph; and (iii) when the at least one photograph is determined to be acceptable, cause the transmission of the at least one photograph to a central server for further processing.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
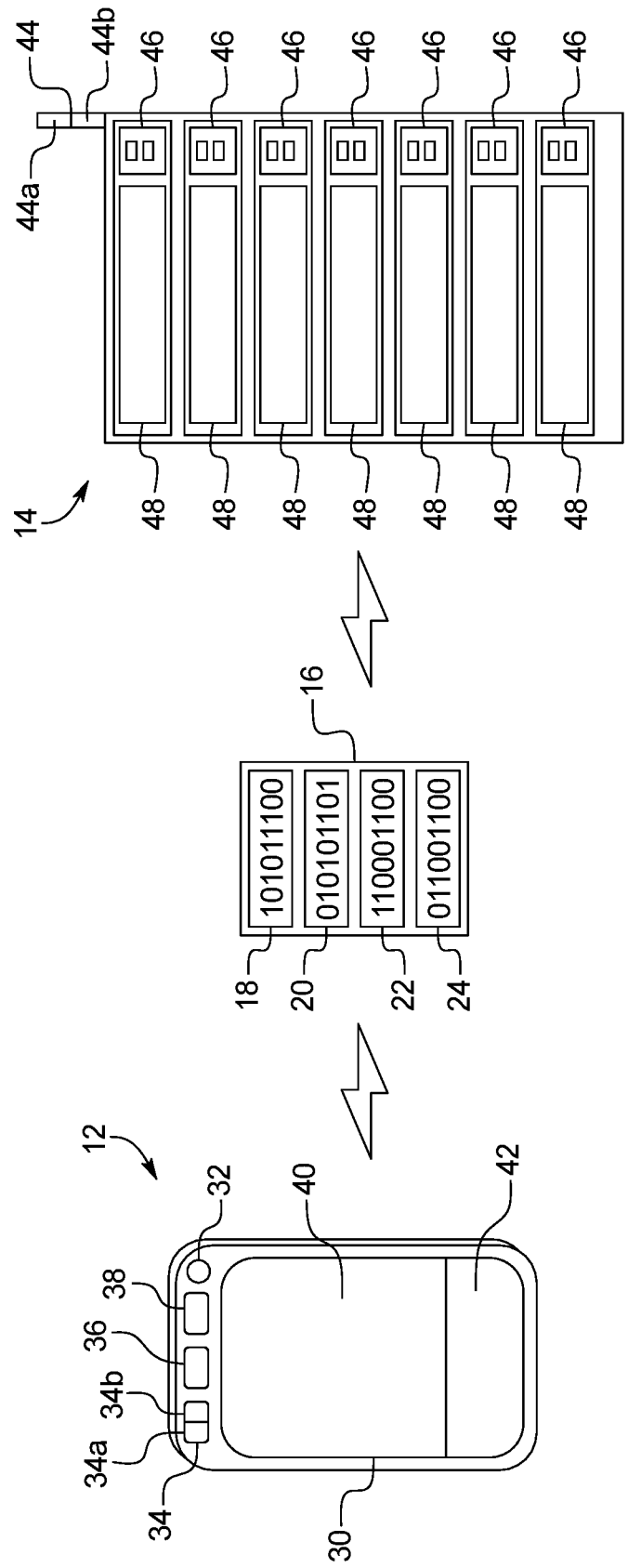
FIG. 1 shows an example embodiment of a verification system for ensuring proper installation and/or repair work in accordance with the present disclosure.

FIG. 1 illustrates an example embodiment of a verification system 10 for ensuring proper installation and/or repair work according to the present disclosure. In the illustrated embodiment, the system 10 includes a mobile device 12 and a central server 14. In use, the mobile device 12 can wirelessly communicate with the central server 14 to transmit data packets 16 including processing instructions 18, one or more photograph 20, one or more work order 22, and/or other types of data 24.

The mobile device 12 can include a user interface 30, a camera 32, a first data transmission device 34, a first processor 36 and a first memory 38. In use, the first processor 36 is configured to execute instructions programmed into and/or stored by the first memory 38. The instructions can be, for example, processing instructions 18 periodically received and/or updated via the data packets 16 transmitted from the central server 14. Once the processing instructions 18 have been stored in the first memory 38, the first processor 36 can then control the user interface 30, the camera 32 and the data transmission device 34 based on the processing instructions 18.

The mobile device 12 can be, for example, a cellular phone, tablet, personal computer or other electronic device. The user interface 30 can include a display screen 40 and an input device 42 such as a touch screen or button pad. The camera 32 can be a standard camera configured to record still images and/or videos. The first data transmission device 34 can include, for example, a transmitter 34a and a receiver 34b configured to send and receive wireless signals.

The transmitter 34a can be any known transmitter capable of sending a wireless signal (e.g., send outgoing electromagnetic waves such as radio waves), for example, by generating a radio frequency alternating current which is applied to an antenna. Likewise, the receiver 34b can be any known receiver capable of receiving a wireless signal (e.g., receiving incoming electromagnetic waves such as radio waves), for example, which extracts information from a radio frequency alternating current which is received by an antenna, converting the radio frequency alternating current into a form useable by the first processor 36 mobile device 12. The transmitter 34a and the receiver 34b can be combined into a single transceiver and/or utilize or include a single antenna or separate antennas.

The central server 14 can include a second data transmission device 44, a second processor 46, and a second memory 48. The second processor 46 is configured to execute control instructions programmed into and/or stored by the second memory 48. The second processor 46 can also be configured to constantly update the processing instructions 18 and transmit the updated processing instructions 18 to the mobile device 12 via the second data transmission device 44, which can include, for example, a transmitter 44a and a receiver 44b configured to send and receive wireless signals.

The transmitter 44a can be any known transmitter capable of sending a wireless signal (e.g., send outgoing electromagnetic waves such as radio waves), for example, by generating a radio frequency alternating current which is applied to an antenna. Likewise, the receiver 44b can be any known receiver capable of receiving a wireless signal (e.g., receiving incoming electromagnetic waves such as radio waves), for example, which extracts information from a radio frequency alternating current which is received by an antenna, converting the radio frequency alternating current into a form useable by the second processor 48 of the central server 14. The transmitter 44a and the receiver 44b can be combined into a single transceiver and/or utilize or include a single antenna or separate antennas.

As discussed herein, the central server 14 transmitting, sending and/or receiving data to or from the mobile device 12, or the mobile device 12 transmitting, sending and/or receiving data to or from the central server 14, can refer to wireless communication between the transmitter 34a and/or the receiver 34b of the first data transmission device 34 and the transmitter 44a and/or the receiver 44b of the second data transmission device 44. It should be understood that the transmitter 34a of the first data transmission device 34 transmits signals/data to the receiver 44b of the second data transmission device 44, and the transmitter 44a of the second data transmission device 44 transmits signals/data to the receiver 34a of the first data transmission device 34.

Various tasks performed according to the methods described herein can be stored as instructions on the first memory 38 and/or the second memory 48. The first processor 36 can execute instructions programmed on the first memory 38, and the second processor 46 can execute instructions programmed on the second memory 48. Those of ordinary skill in the art will recognize that certain steps described herein with respect to one processor/memory combination can be performed by the other processor/memory combination. It should further be understood, however, that dividing the tasks in certain ways as described herein improves various factors such as customer privacy, the processing speed of each processor 36 and 46, and the memory space used/available within each memory 38 and 48.

Figure 2:
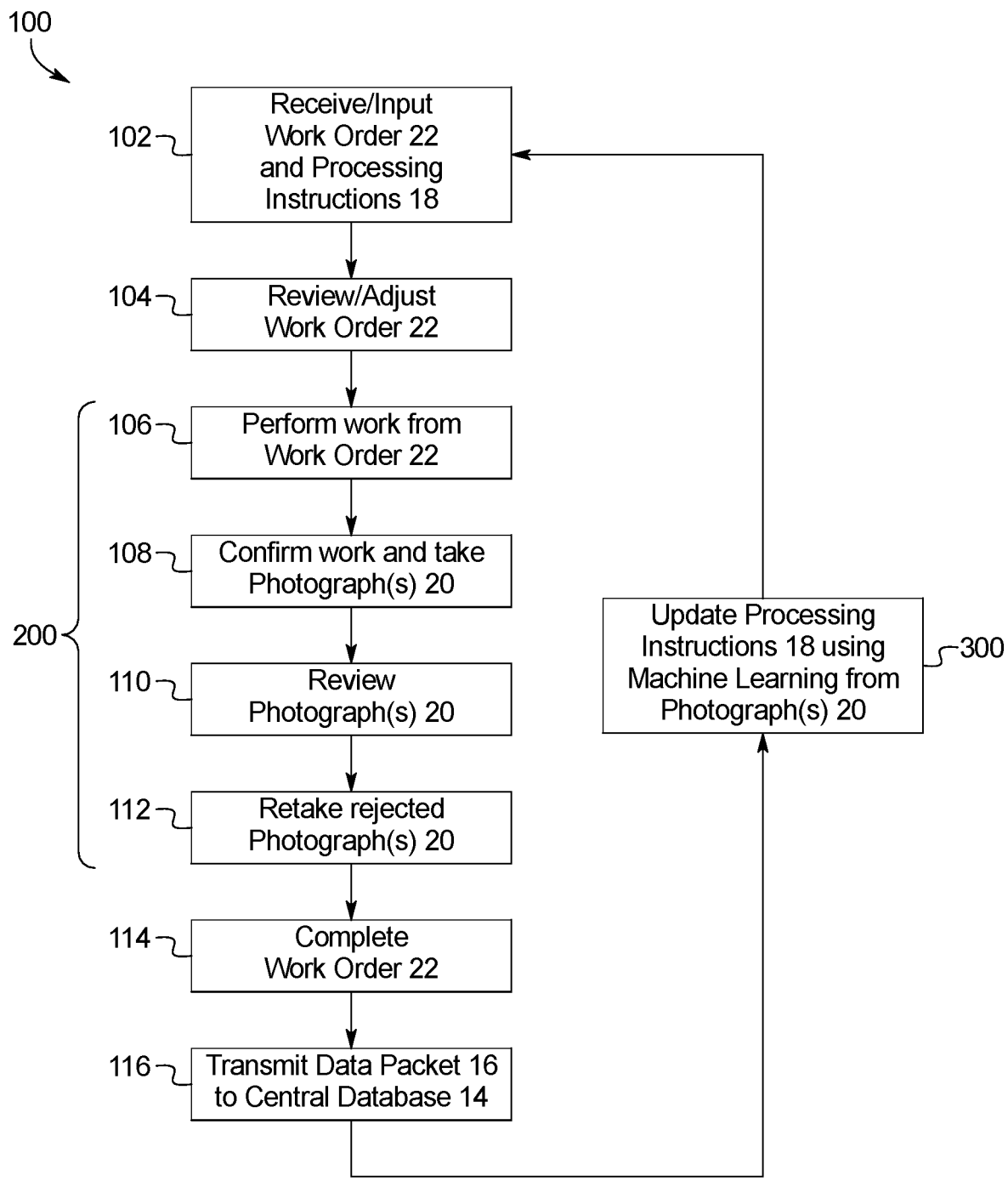
FIG. 2 shows an example embodiment of an installation, repair and/or maintenance method 100 according to the present disclosure.

FIG. 2 illustrates an example embodiment of an installation, repair and/or maintenance method 100 according to the present disclosure. Some or all of the steps of method 100 can be stored as instructions on the first memory 38 and/or the second memory 48 and can be executed by the first processor 36 and/or the second processor 46 in accordance with the respective instructions stored on the first memory 38 and/or the second memory 48. It should be understood that some of the steps described herein can be reordered or omitted without departing from the spirit or scope of method 100.

At step 102, a work order 22 is received into the mobile device 12 and/or the central server 14. If the work order 22 is received at the central server 14, the work order 22 can be transmitted from the transmitter 44a of the central server 14 to the receiver 34b of the mobile device 12. In one embodiment, a customer can request an installation or repair via an internet website or call center, and the work order 22 can be logged at the central server 14 before being transferred via a data packet 16 to the mobile device 12 of a particular technician assigned to perform the installation or repair associated with the work order 22. The data packet 16 transmitted to mobile device 12 can also include up-to-date processing instructions 18 to be stored on the first memory 38 and executed by the first processor 36 as the technician completes the work order 22. In an alternate embodiment, the technician can program the work order 22 directly into the mobile device 12 while onsite using the user interface 30 and/or can request updated processing instructions 18 from the central server 14 at any time.

The processing instructions 18 can guide the technician through the work order 22 using the mobile device 12. The processing instructions 18 can include, for example, up-to-date computer code for running an application on the mobile device 12. By receiving the processing instructions 18 in the same data packet 16 containing a current work order 22, the present system 10 can ensure that the technician's mobile device 12 contains up-to-date processing instructions 18 each time a work order 22 is performed.

At step 104, the technician can review and/or adjust the work order 22, which can occur prior to the technician arriving onsite and/or after the technician arrives onsite. The technician can confirm the work order 22 if the work indicated by the work order 22 appears accurate once arriving onsite. The technician can also adjust the work order 22 if the technician arrives onsite to find that the work order 22 is inaccurate or that additional work needs to be done. In an embodiment, the technician's adjustments can be transmitted back to the central server 14 and approved at the central server 14 before the work commences.

At step 106, the technician performs the work in accordance with the work order 22. In one embodiment, the user interface 30 of the mobile device 12 can provide the technician with step-by-step instructions regarding the work to perform work in accordance with the work order 22. Alternatively, the technician can perform the entirety of the work from the work order 22 before confirming that the steps have been completed via the user interface 30 of the mobile device 12.

At step 108, which can be performed in combination with step 106 and/or after the completion of step 106, the technician can be prompted by the user interface 30 to record one or more photograph 20 of the installation and/or repair work using the camera 32. In an embodiment, the user interface 30 can instruct the technician to take one or more photograph 20 as the work order 22 is being completed such that the technician documents each step of the process. In one embodiment, the processing instructions 18 can prevent the user interface 30 from displaying the next step or remainder of the work order 22 unless the technician has recorded an appropriate photograph 20 as instructed. In an alternative embodiment, the technician can complete the entirety of the work order 22 prior to receiving instructions from the user interface 30 as to which one or more photograph 20 needs to be recorded.

At step 110, which can be performed in combination with steps 106 and 108 and/or after the completion of steps 106 and 108, the first processor 36 can review the one or more photograph 20 based on the processing instructions 18 stored by the first memory 38. In reviewing the one or more photograph 20, the first processor 36 can determined whether each one or more photograph 20 can be deemed acceptable in accordance with the updated processing instructions 18 stored by the first memory 38. A photograph 20 can be deemed acceptable, for example, if the photographs meets a predetermined score or grade (e.g., a predetermined numerical value) based on various factors determined by the updated processing instructions 18 stored by the first memory 38.

In an embodiment, the processing instructions 18 stored by the first memory 38 include criteria which each photograph 20 must meet to be deemed acceptable. The criteria can include, for example, the brightness/darkness of a photograph 20, the clarity/blurriness/resolution of a photograph 20, the angle of a photograph 20, the framing of a photograph 20, the detection of certain elements within a photograph 20, and/or other criteria. Based on a combination of these criteria, the first processor 36 can calculate a score or grade for each photograph 20, with each photograph 20 deemed acceptable if a minimum score is met (e.g., achieves a numerical value which meets or exceeds a predetermined minimum threshold value), and deemed unacceptable if the minimum score is not met (e.g., does not achieve a numerical value which meets or exceeds a predetermined minimum threshold value).

In one embodiment, the processing instructions 18 stored by the first memory 38 can cause the first processor 36 to perform a pixel-based comparison for the photograph 20. With a pixel-based comparison, the first processor 36 can use the spectral information for a plurality of individual pixels and assign a grade or score based on some or all of the individual pixels. For example, the first processor 36 can determine spectral information such as the intensity of each pixel and assign a grade or score based on some or all of the pixels meeting a predetermined threshold.

In another embodiment, the processing instructions 18 stored on the first memory 38 can cause the first processor 36 to perform an object-based comparison for the photograph. With an object-based comparison, the first processor 36 can use the spectral information for a localized group of pixels and assign a grade or score based on one or more localized group of pixels. For example, the first processor 36 can determine spectral information such as the intensity of each localized group and assign a grade or score based on some or all of the pixels meeting a predetermined threshold.

In an example embodiment, each pixel or localized group of pixels can be assigned one or more brightness value ($B_V$) based on an RGB color model (e.g., using one or more RGB value between 0 (dark) and 255 (bright)). For example, the brightness value ($B_V$) for each pixel can be determined by averaging a plurality of RGB values for each pixel. Alternatively, one or more RGB values can be used as one or more brightness values ($B_V$). In this example, the first processor 36 can then assign a brightness score or grade ($C_b$) using one or more RGB value and/or one or more brightness value ($B_V$), for example, by calculating an average score using some or all of the pixels or regions of pixels. The optimal score or grade can be above a certain threshold value, below a certain threshold value, and/or between certain threshold values. For example, an ideal RGB brightness value ($B_V$) earning a score ($C_b$) of 10 on a 1-10 scale can be between a lower threshold $X_b$ and an upper threshold $Y_b$, with increments of $Z_b$ determining the overall score (i.e., $C_b$ of 10 for $X_b \leq B_V \leq Y_b$; $C_b$ of 9 for $(X_b-Z_b) \leq B_V \leq (Y_b+Z_b)$; $C_b$ of 8 for $(X_b-2Z_b) \leq B_V \leq (Y+2Z_b)$; $C_b$ of 7 for $(X_b-3Z_b) \leq B_V \leq (Y_b+3Z_b)$; etc.). Those of ordinary skill in the art will recognize that this is an example only and that other scoring methods can be used.

In another example embodiment, again using RGB values, the first processor 36 can also assign a clarity or blurriness score ($C_c$) using one or more RGB values and/or one or more brightness value ($B_V$) for each pixel by finding slow transitions between adjacent pixels or regions of pixels. For example, in certain pictures, it should be expected for a sharp change in RGB and/or brightness between various different components within the picture. If the first processor 36 does not find a predetermined number or percentage of sharp changes between adjacent pixels or regions of pixels, the first processor 36 can determine the picture to be blurry. For example, an ideal clarity can be calculated as earning a score ($C_c$) of 10 on a 1-10 scale based on a predetermined number or percentage of adjacent pixels or regions showing a predetermined threshold difference using RGB values (e.g., a difference of 50, 60, 70, etc. for adjacent pixels on a 0-255 scale). Those of ordinary skill in the art will recognize that this is an example only and that other scoring methods can be used.

In one embodiment, again using RGB values, the first processor 36 can look for expected components within a photograph 20 by comparing the pixels within the photograph 20 taken by the technician to one or more known photographs showing the expected components. In doing so, the first processor 36 can look for expected RGB patterns in the pixels. In an embodiment, the components installed by the technician can include certain colors or markers to enable the first processor 36 to locate certain elements. The first processor 36 can then use those colors or markers to determine the presence of the component. If the component is detected, the processor can then determine at least one of (i) brightness (e.g., comparing the RGB/brightness of the expected component's or markers' pixels to a preferred RGB/brightness based on prior photographs); (ii) clarity (e.g., comparing RGB/brightness transitions within the expected component or markers or at the edge of the expected component or markers to expected or preferred RGB/brightness transitions based on prior photographs); (iii) angle (e.g., comparing the shape of the region of pixels showing the expected component or markers to the shape of the region of the component or markers in prior photographs); (iv) framing (e.g., comparing the size of the region of pixels showing the expected component or markers to the size of the region of the component or markers in prior photographs); and/or (v) any other suitable or helpful determination.

In this embodiment, for example, the angle and framing scores (e.g., on a 1-10 scale) can be determined by how close the shape and size of an expected region of pixels matches the shape and size of a region of pixels from photographs of known components. For example, a higher score (e.g., 10 on a 1-10 scale) can be assigned for near perfect matches in shape and size, with lower scores assigned based on the percentage differences in shape and size. The regions of pixels used in this determination can include, for example, the entire expected component, a portion of the expected component, the colors or markers used to recognize the component, and/or any other appropriate region.

In a general example embodiment, a photograph 20 can receive a numerical score (e.g. between 1-10) for one or more of the following factors: (i) brightness; (ii) clarity (e.g. resolution), (iii) angle; (iv) framing (e.g., zoom); and (v) the detection of expected elements. In one embodiment with these five categories, the photograph can be deemed acceptable only if each category meets a minimum score (e.g., if the photograph 20 achieves a minimum score of 8 out of 10 in each of the five categories). In another embodiment, the photograph can be deemed acceptable only if the total sum of the scores for each category meets a minimum score (e.g., if the sum of all scores achieves a minimum score of 40 out of 50). In another embodiment, both the scores for each category and the total sum for all categories must meet a minimum (e.g., each category achieving a minimum score of 8 out of 10 and the total sum of all scores achieving a minimum score of 40 out of 50). Additionally, more important categories can be weighted more heavily than other categories in the scoring process. Those of ordinary skill in the art will further understand that the five categories listed above and the 10-point scoring system are examples only, and that more or less categories and various numerical values can be used to grade each photograph 20. In an embodiment, the scoring system can constantly change as updated processing instructions 18 are received by the mobile device 12 from the central server 14.

In an example embodiment, the first processor 36 can calculate a score ($S_P$) for each photograph 20, for example, using the following equation:

$$S_P = \frac{(W1 \times C1) + (W2 \times C2) + \ldots (Wn \times Cn)}{\text{(number of categories rated)}} \quad \text{(Equation 1)}$$

With Equation 1, $C_1, C_2 \ldots C_n$ represent individual scores for n number of categories, and $W_1, W_2 \ldots W_n$ represent weights applied to each rating category. The weights can be any number. In an embodiment, the weights can be numbers between and including zero (0) and (1) (e.g., $0 \leq W \leq 1$), which will cause the total score ($S_P$) to be calculated on the same scale as the individual categories (e.g., a 1-10 scale in the example above). Thus, in a specific example using the categories discussed above, an example embodiment of Equation 1 can appear as follows:

$$S_P = \frac{(Wb \times Cb) + (Wc \times Cc) + (Wa \times Ca) + (Wf \times Cf) + (Wd \times Cd)}{5}$$

In this specific example, $C_b$ is a score for brightness/darkness, $C_c$ is a score for clarity/blurriness/resolution, $C_a$ is a score for the angle, $C_f$ is a score for the framing, and $C_d$ is a score based on the detection of expected elements. Additionally, in the above embodiment, $W_b$ is a brightness/darkness weight, $W_c$ is a clarity/blurriness/resolution weight, $W_a$ is an angle weight, $W_f$ is a framing weight, and $W_d$ is a detected element weight. It should be understood by those of ordinary skill in the art that this is an example only and that more or less ratings/weights can be used.

In another example embodiment, the first processor 36 can first attempt to detect one or more expected element within a photograph 20 before assigning a score or grade to the photograph 20. If the expected element is not detected, the first processor 36 can cause the user interface 30 to instruct the technician take an additional photograph, can cause the camera 32 to be adjusted for the additional photograph 20, and/or can provide specific instructions for adjustments to be made to ensure a better photograph 20. In this embodiment, only once one or more expected element is detected within a photograph 20 will the first processor 36 calculate a score ($S_P$) for the photograph 20 (e.g. using Equation 1 above). For example, the first processor 36 can evaluate a photograph known to include an expected element for brightness and clarity be applying Equation 1 as follows:

$$S_P = \frac{(Wb \times Cb) + (Wc \times Cc)}{2}$$

In this specific example, $C_b$ is a score for brightness/darkness, $C_c$ is a score for clarity/blurriness/resolution, $W_b$ is a brightness/darkness weight, and $W_c$ is a clarity/blurriness/resolution weight. It should be understood by those of ordinary skill in the art that this is an example only and that more or less ratings/weights can be used.

At step 112, which can be performed during steps 106, 108 and 110 and/or after the completion of steps 106, 108 and 110, the technician can be prompted by the mobile device 12 to retake one or more photograph 20 taken during step 110. One or more photograph 20 may need to be retaken, for example, if deemed unacceptable for not meeting the minimum score or grade at step 110. One or more photograph 20 may also need to be retaken regardless of the minimum score or grade, for example, if an expected element is not detected. If all photographs 20 meet the minimum score or grade at step 110 and are deemed acceptable, then first processor 36 can skip step 112 and proceed directly from step 110 to step 114.

In an embodiment, the first processor 36 can automatically adjust the camera 32 to fix any deficiencies with a photograph 20 at step 112. For example, if a photograph 20 is deemed to be too dark at step 110 (e.g., if an RGB and/or other brightness value is too low for a region of pixels), the first processor 36 can cause the camera 32 to adjust a flash or alternate lighting for an additional photograph 20. Likewise, if a photograph 20 is deemed to be too blurry at step 110 (e.g., if an expected RGB and/or other brightness transition at a known component is too low), the first processor 36 can adjust the focus of the camera 32 for an additional photograph 20. Likewise, if an expected component within a photograph 20 is deemed to be misshapen or too small/large at step 110 (e.g., if an expected shape or region is misshapen or too small/large), the first processor 36 can adjust the angle or zoom of the camera 32 for an additional photograph 20 to match the expected shape and/or size. Alternatively, the user interface 30 can instruct the technician regarding how to retake an appropriate photograph 20, for example, by instructing the technician to adjust the flash/lighting, adjust the clarity, zoom in, zoom out, adjust the angle of the photograph 20, adjust the visibility of the components in the photograph 20, and/or to make additional or alternative adjustments.

After one or more photograph 20 has been retaken at step 112, the retaken photograph one or more photograph 20 is processed in the same way that the original one or more photograph 20 was processed at step 110. In an embodiment, if the retaken one or more photograph 20 is deemed unacceptable, mobile device 12 can require the technician to continue taking photographs 20 until an acceptable one or more photograph 20 meeting a minimum grade or score has been taken, for example, by preventing the technician from completing the work order 22 at step 114 until the appropriate number of photographs 20 are deemed acceptable. In an alternative embodiment, the technician can be allowed complete the work order 22 at step 114 after a predetermined number of photographs 20 have been taken, even if none of the photographs 20 are deemed acceptable, enabling the technician to complete the work order 22 in situations where it is impossible to take a photograph 20 deemed acceptable according to the processing instructions 18 saved by the memory device 38. When there are no acceptable photographs 20, the first processor 36 can select the photograph 20 with the highest grade or score and save that photograph 20 in place of an acceptable photograph 20.

If multiple photographs 20 have been taken, the first processor 36 can cause one or more of the photographs 20 to be erased from the first memory 38 prior to or at completion of the work order 22 at step 114. For each step of the work order 22, if one photograph 20 is deemed acceptable, then the first processor 36 can cause one or more of the unacceptable photographs 20 to be erased from the first memory 38. If none of the photographs 20 have been deemed acceptable according to the processing instructions 18 saved by the first memory 38, then the first processor 36 can cause the first memory 38 to save only the highest graded or scored of the unacceptable photographs 20 and erase the rest of the photographs 20 from the first memory 38. By deleting photographs 20 in this manner, the first processor 36 can conserve the memory space of the first memory 38, while also decreasing the size of the data packet 16 transmitted to the central server 14.

At step 114, the technician can confirm that the work order 22 has been completed. Upon completion of the work order 22, the first processor 36 can create the data packet 16 to include the one or more photograph 20 deemed acceptable or best and/or other data 24 associated with the work order 22 such as notes from the technician and/or the scores or grades of the one or more photograph 20.

At step 116, the first processor 36 can cause the first data transmission device 34 to transmit the data packet 16 to the second transmission device 44 of the central server 14. For example, the first processor 36 can cause the transmitter 34a of the first data transmission device 34 to convert the data packet 16 into electromagnetic waves which are then transmitted to the receiver 44b of the second transmission device 44, which can convert the electromagnetic waves into useable data by the second processor 46 of the central server 14.

It should be understood that any of the steps of method 100 performed by the first processor 36 can also be performed by the second processor 46, for example, by placing the mobile device 12 in real-time wireless communication with the central server 14 while the technician performs the work order 22 during the method 100.

Figure 3:
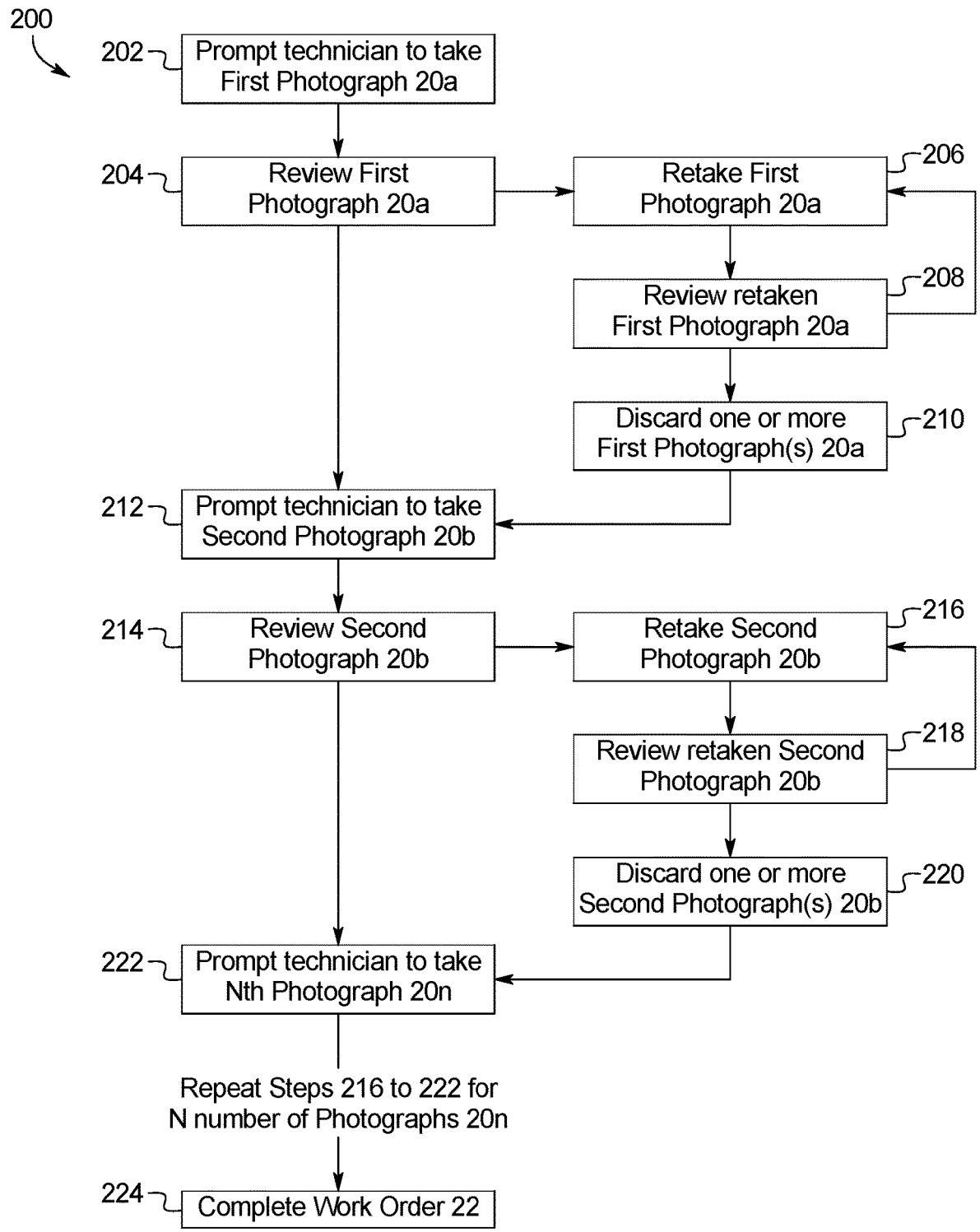
FIG. 3 shows an example embodiment of a photograph evaluation method which can be performed as part of the installation, repair and/or management method of FIG. 2.

FIG. 3 illustrates an example embodiment of a method 200 which can be executed at one or more of steps 106, 108, 110 and 112 of method 100. Some or all of the steps of the method 200 can be stored as instructions on the first memory 38 and can be executed by the first processor 36 in accordance with the instructions stored on the first memory 38. Alternatively, certain steps can also be executed by the second processor 46 in accordance with instructions stored on the second memory 48. It should be understood that some of the steps described herein can be reordered or omitted without departing from the spirit or scope of method 200.

Step 202 can begin after the technician has completed a first step 22a of the work order 22 or after the technician has completed the entirety of the work order 22. At step 202, the technician is prompted by the user interface 30 of the mobile device 12 to take a first photograph 20a of the installation and/or repair performed at the first step 22a of the work order 22. For example, if the first step 22a of the work order 22 involves connecting two components, the user interface 30 can instruct the technician to take the first photograph 20a of the connection between the two components. Likewise, if the first step 22a of the work order 22 involves installation of a satellite receiver, the user interface 30 can instruct the technician to take the first photograph 20a of the satellite receiver.

At step 204, the first processor 36 of the mobile device 12 can process the first photograph 20a according to the most recent processing instructions 18 stored by the first memory 38. The first processor 36 can process the first photograph 20a for example, according to one or more of the scoring or grading systems discussed herein with respect to step 110 of method 100. It should be understood, however, that the scoring or grading systems discussed herein with respect to step 110 of method 100 are examples only and that other scoring or grading systems can also be used to determine acceptability or unacceptability of a photograph 20.

If the first photograph 20a is determined to be acceptable at step 204, the method 200 can proceed to step 212, where the technician can either complete a second step 22b of the work order 22 and take a second photograph 20b, or can take the second photograph 20b if the entirety of the work order 22 has already been completed.

If the first photograph 20a is determined to be unacceptable at step 204, the method 200 can proceed to step 206, where the user interface 30 of the mobile device 12 can prompt the technician to retake the first photograph 20a. The user interface 30 can also prompt the technician with specific instructions which explain why the first photograph 20a was deemed unacceptable at step 204 (e.g., whether an expected element was not detected within the first photograph 20a and/or which category the first photograph 20a scored too low in). For example, the first photograph 20a may have been deemed unacceptable due to poor lighting, clarity, framing, zoom, angles, the failure to detect a particular component expected to be in the photograph, and/or other reasons. By prompting the technician with specific instructions regarding the deficiencies via the user interface 30, the mobile device 12 enables the technician to correct the deficiencies when retaking the first photograph 20a. In various embodiments, the user interface 30 can instruct the technician regarding how to retake an appropriate photograph, for example, by instructing the technician to adjust the flash/lighting, adjust the clarity, zoom in, zoom out, adjust the angle of the photograph, adjust the components taken in the photograph, and/or make additional or alternative adjustments.

In an embodiment, the first processor 36 can automatically adjust the camera 32 to fix some or all of the deficiencies with a first photograph 20*a* at step 206. For example, if the first photograph 20*a* is deemed to be too dark at step 204 (e.g., if an RGB and/or other brightness value is too low for a region of pixels), the first processor 36 can automatically cause the camera 32 to adjust a flash or alternate lighting for the retaken first photograph 20*a*. Likewise, if the first photograph 20*a* is deemed to be too blurry at step 204 (e.g., if an expected RGB and/or other brightness transition at a known component is too low), the first processor 36 can automatically adjust the focus of the camera 32 for the retaken first photograph 20*a*. Likewise, if an expected component within a photograph 20 is deemed to be misshapen or too small/large at step 110 (e.g., if an expected shape or region is misshapen or too small/large), the first processor 36 can adjust the angle or zoom of the camera 32 for an additional photograph 20 to match the expected shape and/or size. Alternatively, the user interface 30 can instruct the technician regarding how to retake an appropriate first photograph 20*a*, for example, by instructing the technician to adjust the flash/lighting, adjust the clarity, zoom in, zoom out, adjust the angle of the first photograph 20*a*, adjust the visibility of the components in the first photograph 20*a*, and/or to make additional or alternative adjustments.

At step 208, the first processor 36 of the mobile device 12 can process the retaken first photograph 20*a* in the same way that the original first photograph 20*a* was processed at step 204. The first processor 36 can process the retaken first photograph 20*a*, for example, according to one or more of the scoring or grading systems discussed herein with respect to step 110 of method 100. It should be understood, however, that the scoring or grading systems discussed herein with respect to step 110 of method 100 are examples only and that other scoring or grading systems can also be used to determine acceptability or unacceptability of a photograph 20.

If the retaken first photograph 20*a* is determined to be unacceptable at step 208, the method 200 returns to step 206, where the user interface 30 of mobile device 12 can prompt the technician to again retake the first photograph 20*a*. The method can then continue alternating between steps 206 and 208 until the technician takes an acceptable first photograph 20*a* or overrides the method 200 to move on to step 210.

Once a retaken first photograph 20*a* is deemed acceptable at step 208, the method can proceed to step 210, where some or all of the first photographs 20*a* taken between steps 202, 204, 206 and 208 can be deleted from the first memory 38, leaving only the acceptable first photograph 20*a* to be saved in the first memory 38. By purging the first memory 38 in this manner, more storage space is available for additional photographs 20 and processing by the first processor 36. If none of the first photographs 20*a* have been deemed acceptable according to the processing instructions 18 saved by the first memory 38, then the first processor 36 can cause the first memory 38 to save only the highest graded or scored of the unacceptable first photographs 20*a* and erase the rest of the first photographs 20*a* from the first memory 38. In an alternative embodiment, the technician can override the scoring system and/or select what the technician believes to be the best of the taken first photographs 20*a* to be saved, with the rest of the taken first photographs 20*a* to be discarded. In an embodiment, the processing instructions 18 can prevent the technician from moving on to step 212 unless at least one first photograph 20*a* is saved.

At step 212, the technician is prompted by the user interface 30 of the mobile device 12 to take a second photograph 20*b* of the installation and/or repair performed at a second step 22*b* of the work order 22. Step 212 can begin after the technician has completed the second step 22*b* of the work order 22 or after the technician has completed the entirety of the work order 22. For example, if the second step 22*b* of the work order 22 involves connecting two components, the user interface 30 can instruct the technician to take the second photograph 20*b* of the connection between the two components. Likewise, if the second step 22*b* of the work order 22 involves installation of a satellite receiver, the user interface 30 can instruct the technician to take the second photograph 20*b* of the satellite receiver. In most embodiments, the second step 22*b* will be different from the first step 22*a*.

At step 214, the first processor 36 of the mobile device 12 can process the second photograph 20*b* according to the most recent processing instructions 18 stored by the first memory 38. The first processor 36 can process the second photograph 20*b* for example, according to one or more of the scoring or grading systems discussed herein with respect to step 110 of method 100. It should be understood, however, that the scoring or grading systems discussed herein with respect to step 110 of method 100 are examples only and that other scoring or grading systems can also be used to determine acceptability or unacceptability of a photograph 20.

If the second photograph 20*b* is determined to be acceptable at step 214, the method 200 can proceed to step 222, where the technician can either complete an Nth (e.g., a third, fourth, fifth, etc.) step 22*n* of the work order 22 and take an Nth (e.g., a third, fourth, fifth, etc.) photograph 20*n*, or can take the Nth photograph 20*n* if the entirety of the work order 22 has already been completed.

If the second photograph 20*b* is determined to be unacceptable at step 214, the method 200 can proceed to step 216, where the user interface 30 of the mobile device 12 can prompt the technician to retake the second photograph 20*b*. The user interface 30 can also prompt the technician with specific instructions which explain why the second photograph 20*b* was deemed unacceptable at step 214 (e.g., whether an expected element was not detected within the second photograph 20*b* and/or which category the second photograph 20*b* scored too low in). For example, the second photograph 20*b* may have been deemed unacceptable due to poor lighting, clarity, framing, zoom, angles, the failure to detect a particular component expected to be in the photograph, and/or other reasons. By prompting the technician with specific instructions regarding the deficiencies via the user interface 30, the mobile device 12 enables the technician to correct the deficiencies when retaking the second photograph 20*b*. In various embodiments, the user interface 30 can instruct the technician regarding how to retake an appropriate photograph, for example, by instructing the technician to adjust the flash/lighting, adjust the clarity, zoom in, zoom out, adjust the angle of the photograph, adjust the components taken in the photograph, and/or make additional or alternative adjustments.

In one embodiment, the first processor 36 can automatically adjust the camera 32 to fix some or all of the deficiencies with a second photograph 20*b* at step 216. For example, if the second photograph 20*b* is deemed to be too dark at step 214 (e.g., if an RGB and/or other brightness value is too low for a region of pixels), the first processor 36 can automatically cause the camera 32 to adjust a flash or alternate lighting for the retaken second photograph 20*b*. Likewise, if the second photograph 20*b* is deemed to be too blurry at step 214 (e.g., if an expected RGB and/or other brightness transition at a known component is too low), the second photograph 20b can automatically adjust the focus of the camera 32 for the retaken second photograph 20b. Likewise, if an expected component within a photograph 20 is deemed to be misshapen or too small/large at step 110 (e.g., if an expected shape or region is misshapen or too small/large), the first processor 36 can adjust the angle or zoom of the camera 32 for an additional photograph 20 to match the expected shape and/or size. Alternatively, the user interface 30 can instruct the technician regarding how to retake an appropriate second photograph 20b, for example, by instructing the technician to adjust the flash/lighting, adjust the clarity, zoom in, zoom out, adjust the angle of the second photograph 20b, adjust the visibility of the components in the second photograph 20b, and/or to make additional or alternative adjustments.

At step 218, the first processor 36 of the mobile device 12 can process the retaken second photograph 20b in the same way that the original second photograph 20b was processed at step 214. The first processor 36 can process the retaken second photograph 20b, for example, according to one or more of the scoring or grading systems discussed herein with respect to step 110 of method 100. It should be understood, however, that the scoring or grading systems discussed herein with respect to step 110 of method 100 are examples only and that other scoring or grading systems can also be used to determine acceptability or unacceptability of a photograph 20.

If the retaken second photograph 20b is determined to be unacceptable at step 208, the method 200 returns to step 216, where the user interface 30 of mobile device 12 can prompt the technician to again retake the second photograph 20b. The method can then continue alternating between steps 216 and 218 until the technician takes an acceptable second photograph 20b or overrides the method 200 to move on to step 220.

Once a retaken second photograph 20b is deemed acceptable at step 218, the method can proceed to step 220, where some or all of the second photographs 20b taken between steps 212, 214, 216 and 218 can be deleted from the first memory 38, leaving only the acceptable second photograph 20b to be saved in first memory 38. By purging the first memory 38 in this manner, more storage space is available for additional photographs 20 and processing by the first processor 36. If none of the second photographs 20b have been deemed acceptable according to the processing instructions 18 saved by the first memory 38, then the first processor 36 can cause the first memory 38 to save only the highest graded or scored of the unacceptable second photographs 20b and erase the rest of the second photographs 20b from the first memory 38. In an alternative embodiment, the technician can override the scoring system and/or select what the technician believes to be the best of the taken second photographs 20b to be saved, with the rest of the taken second photographs 20b to be discarded. In an embodiment, the processing instructions 18 can prevent the technician from moving on to step 222 unless at least one second photograph 20b is saved.

At step 222, the technician is prompted by the user interface 30 of the mobile device 12 to take an Nth (e.g., a third, fourth, fifth, etc.) photograph 20n of the installation and/or repair performed at an Nth step 22n of the work order 22. Step 222 can begin after the technician has completed each Nth step 22n of the work order 22 or after the technician has completed the entirety of the work order 22. Step 222 can be repeated for as many steps and/or photographs 20n are required for the technician to complete the work order 22. The first processor 36 can then process each Nth photograph 20n in the same way that the first photograph 20a and second photograph 20b have been processed.

At step 114, the technician's mobile device 12 should have a photograph 20a, 20b . . . 20n saved for each step 22a, 22b . . . 22n of work order 22. At this point, the technician can confirm that the work order 22 has been completed. Upon completion of the work order 22, the first processor 36 can create the data packet 16 to include each photograph 20a, 20b . . . 20n deemed acceptable or best for each step 22a, 22b . . . 22n, notes from the technician with respect to each step and/or photograph, and/or other data 24 associated with the work order 22, which can then be transmitted to central server 14. For example, the first processor 36 can cause the transmitter 34a of the first data transmission device 34 to convert the data packet 16 into electromagnetic waves which are then transmitted to the receiver 44b of the second transmission device 44, which can convert the electromagnetic waves into useable data by the second processor 46 of the central server 14.

It should be understood that any of the steps of method 200 performed by first processor 36 can also be performed by the second processor 46, for example, by placing the mobile device 12 in real-time wireless communication with central server 14 while the technician performs the work order 22 during method 200.

Figure 4:
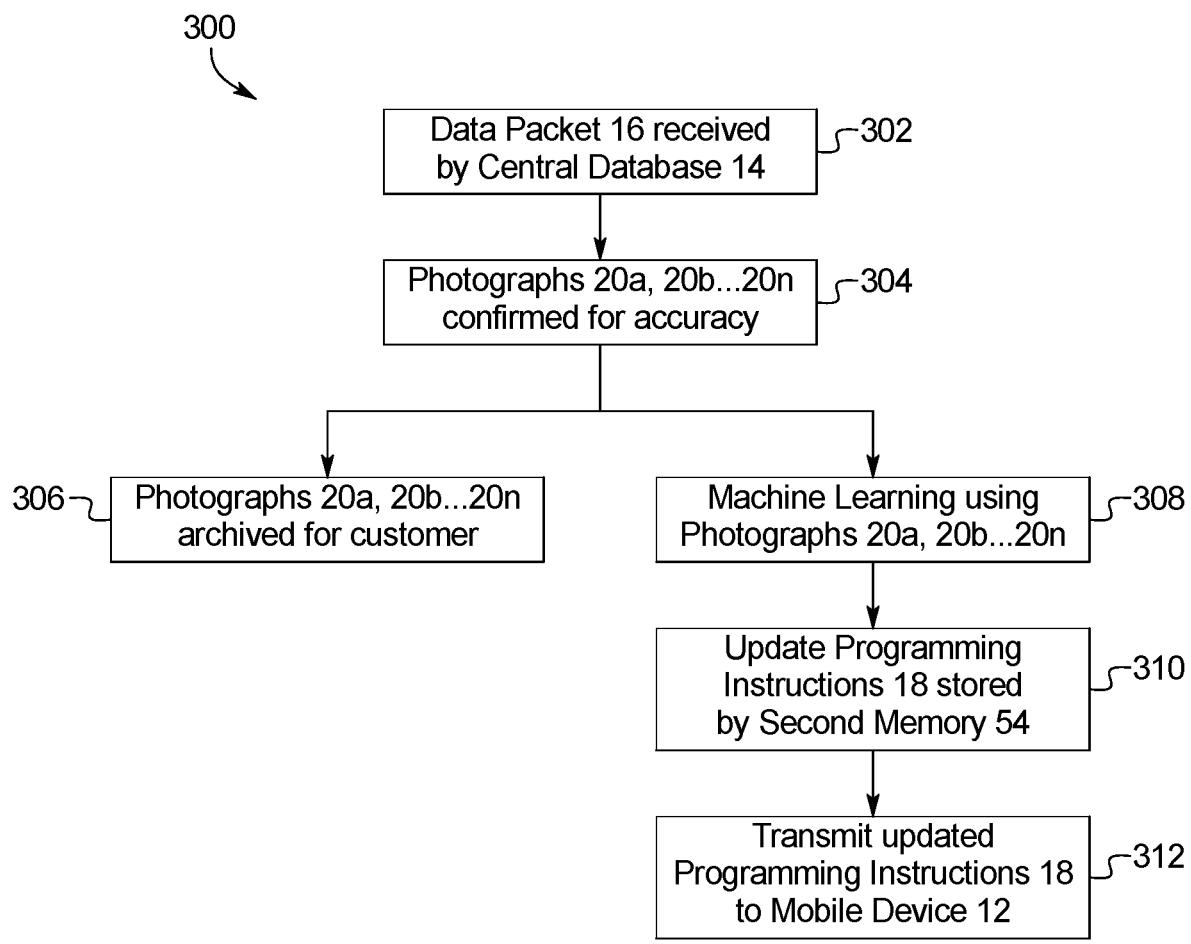
FIG. 4 shows an example embodiment of a machine learning method which can be performed as part of the installation, repair and/or management method of FIG. 2.

FIG. 4 illustrates an example embodiment of a method 300 which can be executed at the central server 14 after the technician completes the work order 22 at step 114 of method 100 and/or method 200. Some or all of the steps of the method 300 can be stored as control instructions on the second memory 48 and can be executed by the second processor 46 in accordance with the instructions stored on the second memory 48. Alternatively, certain steps can also be executed by the first processor 36 in accordance with the instructions stored on the first memory 38. It should be understood that some of the steps described herein can be reordered or omitted without departing from the spirit or scope of method 300.

At step 302, the receiver 44b of the second data transmission device 44 of the central server 14 receives a data packet 16 from the transmitter 34a of the first data transmission device 34 of the mobile device 12. The data packet 16 can include, for example, the work order 22 completed by the technician using methods 100 and/or 200, the photographs 20a, 20b . . . 20n taken by the technician during the methods 100 and/or 200, notes taken by the technician related to the work order 22 and/or the photographs 20a, 20b . . . 20n, and/or other data 24 associated with the work order 22. In an embodiment, the receiver 44b can receive the data packet 16 in the form of electromagnetic waves received by an antenna, which the receiver 44b can then convert into useable data by the second processor 46 of the central server 14.

At step 304, each of the photographs 20a, 20b . . . 20n from the data packet 16 can be processed by the second processor 46 according to control instructions stored by the second memory 48 (e.g., similar to the processing using the processing instructions 18 discussed herein). In an embodiment, the second processor 46 can process each of the photographs 20a, 20b . . . 20n, for example, according to one or more of the scoring or grading systems discussed herein with respect to step 110 of method 100. It should be understood, however, that the scoring or grading systems discussed herein with respect to step 110 of method 100 are examples only and that other scoring or grading systems can also be used to determine acceptability or unacceptability of a photograph 20. Alternatively, the second processor 46 can process each of the photographs 20*a*, 20*b* . . . 20*n* according to stricter criteria than used by the first processor 36 in preparation to use only the most accurate (e.g. highest scoring or graded) photographs in the machine learning step 308. For example, if a photograph 20 is deemed acceptable with a score of 8 out of 10 in each category and/or an overall score of 40 out of 50 at the example of step 110, the photograph 20 may still only be deemed acceptable for transfer to step 308 if the photograph 20 scores 9 out of 10 in each category and/or an overall score of 45 out of 50 at step 304. The reason for this increased baseline, for example, may be due to only allowing only the best photographs to be used at the machine learning portion of method 300.

At step 306, the second memory 48 stores some or all of the photographs 20*a*, 20*b* . . . 20*n*, along with notes taken by the technician and/or specific details associated with work order 22. The photographs 20*a*, 20*b* . . . 20*n* can then be used, for example, in response to follow-up calls or complaints from the same customer who requested the work order 22, to audit the quality of the work performed by the technician, to train future technicians, and/or for any other business reason. For this reason, the second memory 48 can save all of the photographs 20*a*, 20*b* . . . 20*n* regardless of a score or grade, since the purpose of storing the photographs 20*a*, 20*b* . . . 20*n* at step 306 is to archive the photographs for later use by an individual. In this respect, step 306 can use an alternative memory source besides the second memory 48 to store the photographs 20*a*, 20*b* . . . 20*n*, along with notes taken by the technician and/or specific details associated with work order 22, which will maximize the memory space available by second memory 48 and possibly improve the processing speed of second processor 46 for steps 302, 304, 308, 310 and/or 312.

At step 308, the second processor 46 can improve methods 100 and/or 200 for future use by a technician by using some or all of the photographs 20*a*, 20*b* . . . 20*n* in a machine learning process. In an embodiment, only certain photographs 20*a*, 20*b* . . . 20*n* that meet certain criteria are used in the machine learning process of step 308. The criteria can include, for example, the brightness/darkness of each photograph, the clarity/blurriness/resolution of each photograph, the angle of each photograph, the framing of each photograph, the detection of certain elements within each photograph, and/or other criteria. Based on a combination of these criteria, the second processor 38 can calculate a score or grade for each photograph 20*a*, 20*b* . . . 20*n*, with each photograph 20*a*, 20*b* . . . 20*n* deemed acceptable if a minimum score is met (e.g., achieves a numerical value which meets or exceeds a predetermined minimum threshold value), and deemed unacceptable if the minimum score is not met (e.g., does not achieve a numerical value which meets or exceeds a predetermined minimum threshold value).

As discussed above, in a general example embodiment, a photograph 20*a*, 20*b* . . . 20*n* can receive a numerical score between 1-10 for one or more of the following factors: (i) brightness; (ii) clarity (e.g. resolution), (iii) angle; (iv) framing (e.g., zoom); and (v) the detection of expected elements. In one embodiment, the grade or score for a photograph to be deemed acceptable at step 304 can be the same grade or score for a photograph to be deemed acceptable at step 110 discussed above. Alternatively, step 308 may only use photographs 20*a*, 20*b* . . . 20*n* meeting stricter criteria than used at step 110, with the purpose of only using the highest quality and/or most accurate photographs 20 with machine learning to improve the processing instructions 18.

At step 308, the second processor 46 uses one or more of the photographs 20*a*, 20*b* . . . 20*n* in a machine learning process to improve and update the processing instructions 18 used by the mobile device 12 onsite during the completion of work orders 22. As understood by those of ordinary skill in the art, machine learning processes can use patterns in photographs to build an algorithm (e.g. mathematical model) to enable a computer program to recognize similar photographs. As a greater number of photographs 20 are used in the training portion of the machine learning process, the resulting algorithm (e.g. mathematical model) becomes more accurate. Thus, by continuously training in real-time with new photographs 20 taken by technicians onsite during the completion of work orders, the algorithm used by the processing instructions 18 can be continuously improved. Thus, at step 308, the second processor 46 uses one or more of the photographs 20*a*, 20*b* . . . 20*n* to improve the algorithm used to score or grade future photographs 20 taken onsite by technicians. In an embodiment, one or more neural networks can be used to perform step 308.

At step 310, the second processor 46 uses the updated algorithm from the machine learning performed at step 308 to improve and update the processing instructions 18 stored by the second memory 48. By continuously performing the machine learning at step 308 and updating the processing instructions 18 at step 310, the processing performed on one or more photograph 20 using a mobile device 12 while the technician is onsite is continuously improved.

At step 312, the updated processing instructions 18 can be transmitted to one or more mobile devices 12 used by onsite technicians, for example, by transmitting electromagnetic waves from the transmitter 44*a* of the second transmission device 44 to the receiver 34*b* of the first transmission device 34, wherein the receiver 34*b* can then convert the electromagnetic waves into useable data by the first processor 36 of the mobile device 12. The processing instructions 18 can be transmitted to the mobile devices 12, for example, either periodically or on demand by technicians. As discussed herein, the processing instructions 18 can also be sent to mobile devices 12 each time a technician receives a new work order 22, for example, by transmitting a data packet 16 including both the work order 22 and the processing instructions 18 from the central server 14 to the mobile device 12. By transmitting the updated processing instructions 18 in a data packet 16 with the work order 22, the present methods can ensure that the onsite technicians are always using the most accurate processing instructions 18 when completing work orders 22 and taking photographs 20.

The embodiments described herein provide improved systems and methods for ensuring proper installation and/or repair work. The improved systems and methods use machine learning from photographs taken by an onsite technician to ensure that installation and/or repair work is performed and documented correctly. It should be understood that various changes and modifications to the system and method described herein will be apparent to those skilled in the art and can be made without diminishing the intended advantages.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a connecting device.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A system for installation or repair work, the system comprising:
    a mobile device including a camera, a first processor, and a first memory, the first processor configured to execute processing instructions stored by the first memory, the processing instructions including an algorithm to evaluate photographs recorded by the camera; and
    a central server configured to wirelessly communicate with the mobile device, the central server including a second processor and a second memory, the second processor configured to execute control instructions stored on the second memory to cause the central server to: (i) receive at least one photograph recorded by the camera of the mobile device after completion of a first work order for the installation or repair work and evaluated by the first processor of the mobile device for one or more colors or markers that identify one or more expected components involved in the installation or repair work of the first work order; (ii) perform machine learning using pattern recognition of the one or more colors or markers that identify one or more expected components involved in the installation or repair work in the at least one photograph to improve the algorithm used to evaluate the at least one photograph by the first processor of the mobile device; (iii) update the processing instructions using the improved algorithm; and (iv) transmit the updated processing instructions to the mobile device to enable evaluation of at least one subsequent photograph.

2. The system of claim 1, wherein the processing instructions are configured to further cause the first processor to evaluate the at least one photograph based on at least one of: (i) brightness; (ii) clarity, (iii) angle; and (iv) framing.

3. The system of claim 1, wherein the processing instructions are configured to cause the first processor to evaluate the at least one photograph by calculating a numerical score for the at least one photograph.

4. The system of claim 3, wherein the processing instructions are configured to cause the first processor to assign at least one weight to at least one of a plurality of categories when calculating the numerical score.

5. The system of claim 1, wherein the processing instructions are configured to cause the first processor to evaluate a size or shape of a region of pixels including the one or more colors or markers that identify the one or more expected components.

6. The system of claim 1, wherein the control instructions are configured to (i) cause the second processor to evaluate the at least one photograph for acceptability, and (ii) only perform machine learning using the at least one photograph when the at least one photograph is determined to be acceptable.

7. The system of claim 1, wherein the central server is configured to transmit the updated processing instructions to the mobile device as part of a data packet used to transmit a second work order regarding subsequent installation or repair work.

8. A method for installation or repair work, the method comprising:
    recording at least one first photograph on a mobile device after completion of a first work order for the installation or repair work;
    evaluating the at least one first photograph after completion of the first work order for one or more colors or markers that identify one or more expected components involved in the first work order based on processing instructions stored by the mobile device;
    transmitting the at least one first photograph to a central server configured to perform machine learning using pattern recognition of the one or more colors or markers that identify one or more expected components involved in the first work order in the at least one first photograph;
    receiving updated processing instructions based on the machine learning performed at the central server;
    recording at least one second photograph on the mobile device after completion of a second work order; and
    evaluating the at least one second photograph based on the updated processing instructions.

9. The method of claim 8, wherein the evaluating the at least one first photograph includes further evaluating the at least one first photograph based on at least one of: (i) brightness; (ii) clarity, (iii) angle; and (iv) framing.

10. The method of claim 8, wherein the evaluating the at least one first photograph includes evaluating the at least one first photograph by calculating a numerical score for the at least one first photograph.

11. The method of claim 10, further including assigning at least one weight to at least one of a plurality of categories when calculating the numerical score.

12. The method of claim 10, further including retaking the at least one first photograph if the numerical score is below a predetermined threshold.

13. The method of claim 8, wherein the receiving updated processing instructions includes receiving the updated processing instructions as part of a data packet including the second work order.

14. The method of claim 8, wherein the evaluating the at least one first photograph after completion of the first work order includes evaluating a size or shape of a region of pixels including the one or more colors or markers that identify the one or more expected components.

15. A mobile device for ensuring proper installation or repair work according to a work order, the mobile device comprising:
a user interface configured to be operated by a technician during completion of the work order;
a camera configured to record at least one first photograph and at least one second photograph of at least one task completed by the technician in accordance with the work order, the camera in operable communication with the user interface;
a memory configured to store processing instructions to evaluate photographs recorded by the camera; and
a processor configured to execute the processing instructions stored on the memory to: (i) determine the at least one first photograph to be acceptable to document the at least one task completed by the technician in accordance with the work order, the at least one first photograph determined to be acceptable based on detection of one or more colors or markers that identify one or more expected components related to the at least one task after completion of the at least one task in accordance with the work order; (ii) when the at least one first photograph is determined to be not acceptable due to the one or more expected components not being detected, cause the user interface to display instructions to take at least one second photograph and delete the at least one first photograph from the memory prior to transmission to a central server; and (iii) when the at least one second photograph is determined to be acceptable, cause the transmission of the at least one second photograph to the central server for further processing.

16. The mobile device of claim 15, wherein the processor is configured to assign a numerical score to the at least one first photograph to determine acceptability, the processor determining the at least one first photograph to be acceptable when the numerical score is above a predetermined threshold.

17. The mobile device of claim 15, wherein the processor is configured to automatically adjust the camera upon determining the at least one first photograph to be unacceptable.

18. The mobile device of claim 15, wherein the processor is configured to further determine a brightness of the at least one first photograph to determine acceptability, the processor determining the at least one first photograph to be unacceptable when the brightness is below a predetermined threshold.

19. The mobile device of claim 15, wherein the processor is configured to further determine a clarity of the at least one first photograph to determine acceptability, the processor determining the at least one first photograph to be unacceptable when the clarity is below a predetermined threshold.

20. The mobile device of claim 15, wherein, when the at least one first photograph is determined to be not acceptable due to the one or more expected components not being detected, the processor is configured to execute the processing instructions stored on the memory to cause the user interface to display instructions to take the at least one second photograph and delete the at least one first photograph from the memory prior to transmission from the mobile device.

\* \* \* \* \*